United States Patent [19]

Dolan

[11] Patent Number: 4,597,261
[45] Date of Patent: Jul. 1, 1986

[54] THERMALLY ACTUATED ROCKET MOTOR SAFETY SYSTEM

[75] Inventor: Cyril F. Dolan, Pacific Palisades, Calif.

[73] Assignee: Hughes Aircraft Company, El Segundo, Calif.

[21] Appl. No.: 614,167

[22] Filed: May 25, 1984

[51] Int. Cl.$^4$ .............................................. F02C 9/38
[52] U.S. Cl. ........................................ 60/223; 60/253; 89/1.812
[58] Field of Search ............... 60/39.091, 223, 253, 60/254, 255; 102/289, 290, 291, 481; 89/1.812

[56] References Cited

U.S. PATENT DOCUMENTS

| | | | |
|---|---|---|---|
| 4,442,666 | 4/1984 | Vetter ................................ | 60/253 |
| 4,458,482 | 7/1984 | Vetter et al. ...................... | 60/253 |
| 4,478,151 | 10/1984 | Vetter et al. ...................... | 60/223 |

*Primary Examiner*—Louis J. Casaregola
*Attorney, Agent, or Firm*—Charles D. Brown; Anthony W. Karambelas

[57] ABSTRACT

A thermally actuated rocket motor safety system has a fire temperature pyrotechnic sensor which ignites a gas generator (30) which drives piston (38) to the left. Firing pin (40) strikes the primer in transfer booster assembly (42). The transfer booster assembly transmits explosive energy through window (54) in now open block ring (50) to initiate charge (62) which lies adjacent the rocket motor case. This stresses the rocket motor case by producing a stress raising notch in the case wall. Subsequent grain burning opens the case to vent the rocket motor pressure. Inertia mass (70) slides to the right upon acceleration due to normal rocket motor firing and locks in the rightmost position by means of latch (82). In the locked position, inertia mass (70) prevents leftward motion of the firing pin (40).

25 Claims, 8 Drawing Figures

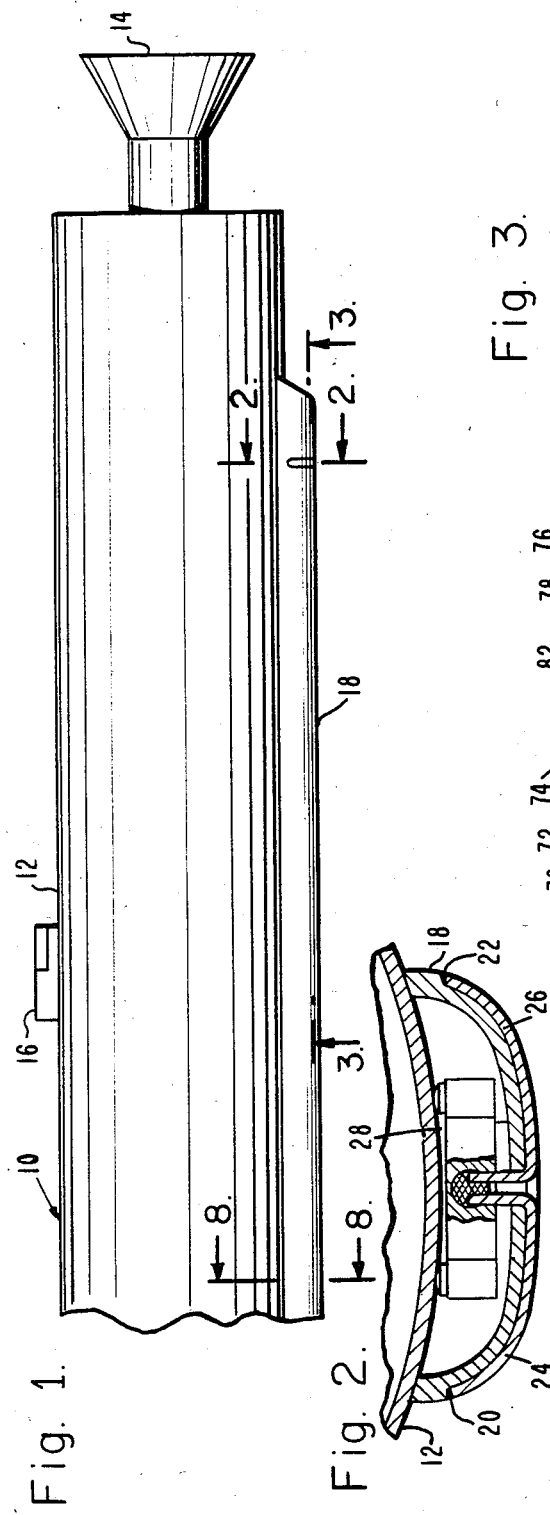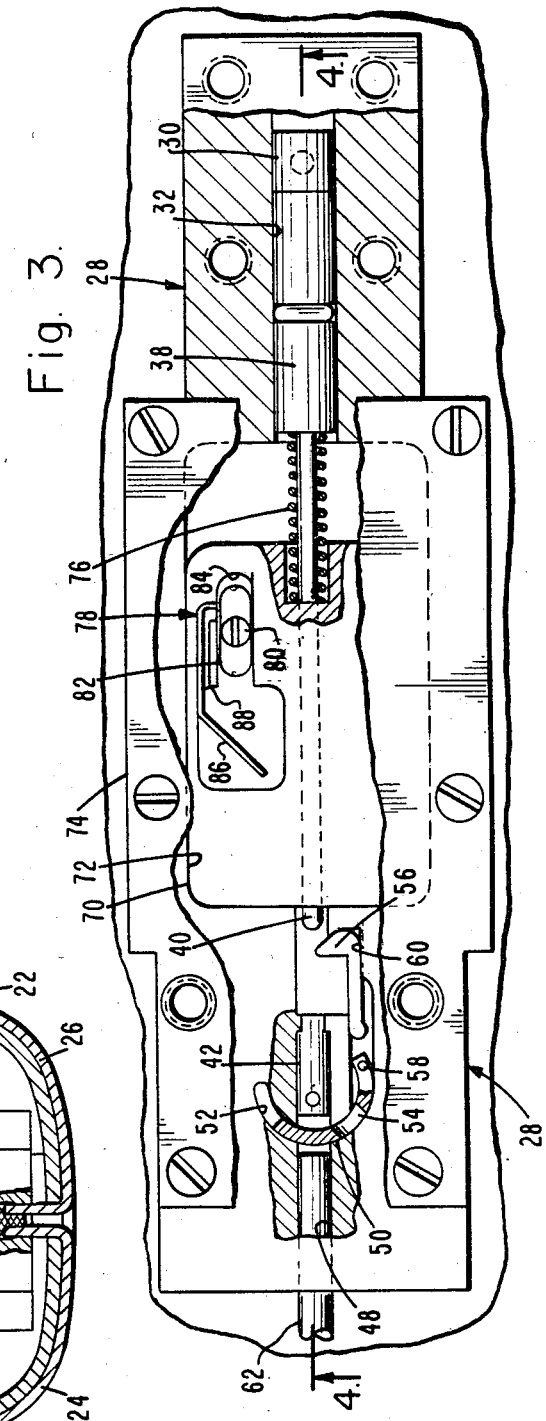

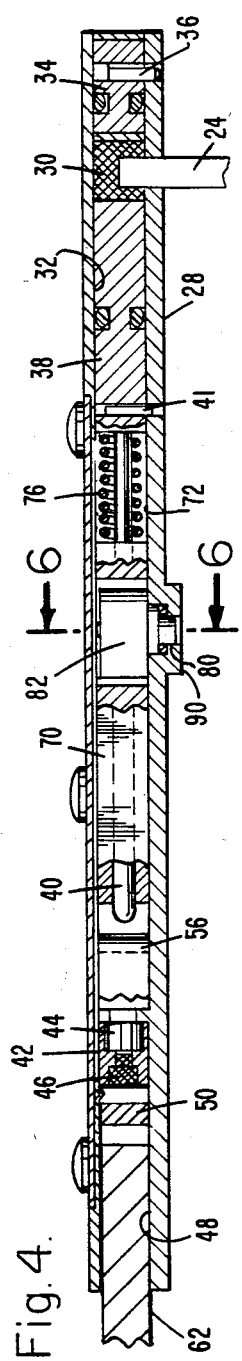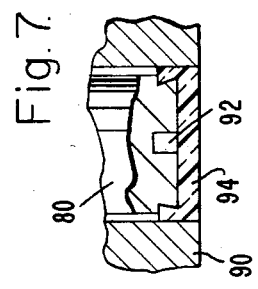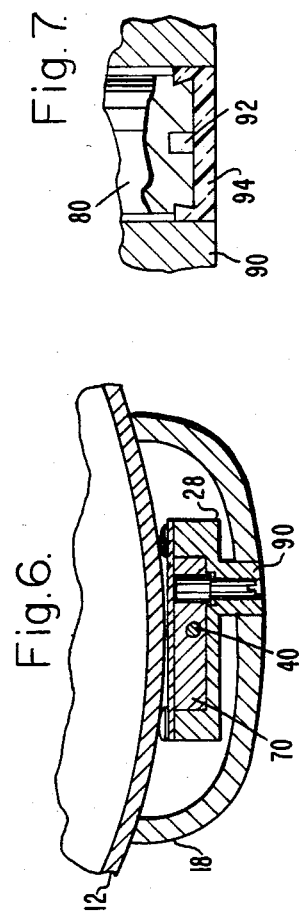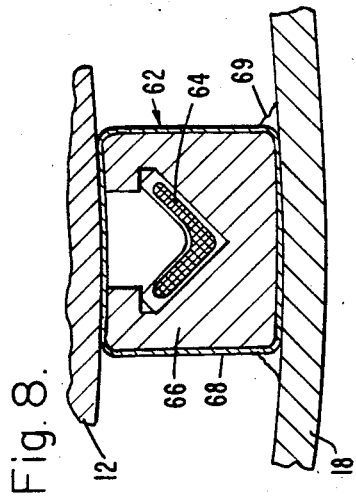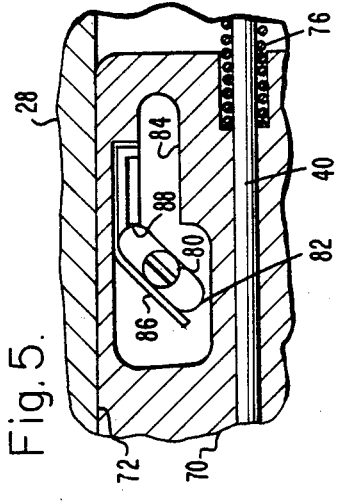

THERMALLY ACTUATED ROCKET MOTOR SAFETY SYSTEM

The Government has rights in this invention pursuant to Contract No. F08635-82-C-0001 awarded by the Department of the Air Force.

TECHNICAL FIELD

This invention is directed to a system which is active on a missile before the firing of its rocket motor and which senses heat around the missile which might ignite the rocket motor. When such heat is sensed, the sides of the rocket motor are opened to prevent pressure buildup in the rocket motor due to fuel combustion and, thus, prevent the rocket from generating thrust.

BACKGROUND OF THE INVENTION

The usual missile has a rocket motor and armament and guidance control systems. The armament has a safety thereon which prevents arming of the warhead until after it is launched. The warhead can be designed to be safe in a fire. However, when a missile motor or a rocket motor is subjected to temperatures which would be reached in a fortuitous fuel fire, the solid fuel of the rocket motor will ignite. Unless steps are taken, ignition will cause thrust and the missile will be propelled. Should this occur in an enclosed space such as a hangar or on an airport or a flight deck, the resultant missile flight is quite dangerous and destructive. Thus, there is need for a missile motor and rocket motor safety system which senses the ambient temperature and prevents the motor from developing thrust.

In addition, the same safety problem exists with any pressure vessel or pressurized gas generator, which may develop thrust when a valve or fitting or adjacent line is burned off by an adjacent fire.

SUMMARY OF THE INVENTION

In order to aid in the understanding of this invention, it can be summarized that it is directed to a thermally actuated safety system wherein a thermal sensor detects temperature around the missile motor, rocket motor, gas generator or pressure vessel above a predetermined value and the system partially or completely cuts the motor case or other pressure vessel when the sensed temperature is reached in order to prevent fuel combustion or other violent pressure release from producing thrust or other damage.

It is a purpose and advantage of this invention to provide a thermally actuated safety system wherein the rocket motor or pressure vessel is rendered ineffective to produce thrust when, while on the ground, it is subjected to temperatures over a sufficient time which will ignite the rocket motor fuel or violently burst the pressure vessel. It is a further purpose and advantage of this invention to provide a safety system which detects and responds to the ambient temperature condition surrounding a rocket motor or other pressure vessel such that when, on the ground, should these temperatures reach dangerous levels over a sufficient length of time, the rocket motor or pressure vessel casing is cut to laterally vent the products of rocket fuel combustion, thus significantly eleminating or releasing the contained pressure without generating significant thrust.

Other purposes and advantages of this invention will become apparent from a study of the following portion of the specification, the claims and the attached drawings.

BRIEF DESCRIPTION OF THE DRAWINGS

FIG. 1 is a side elevational view, with parts broken away, of a missile carrying the thermally actuated safety system of this invention.

FIG. 2 is an enlarged section taken generally along the line 2—2 of FIG. 1.

FIG. 3 is a further enlarged view of the control portion of the safety system, with parts broken away and parts taken in section, as seen when the cover is removed, generally along the line 3—3 of FIG. 1.

FIG. 4 is a longitudinal section through the control portion, as seen generally along the line 4—4 of FIG. 3.

FIG. 5 is an enlarged view of the safety latch shown in FIG. 3, with the latch in the safe position.

FIG. 6 is a section through the control portion at the position of the safety latch, taken generally along line 6—6 of FIG. 4.

FIG. 7 is an enlarged view, with parts broken away and parts taken in section, showing the sealing cap over the stem of the safety latch.

FIG. 8 is an enlarged section through the cutting explosive cord which in the preferred embodiment is a linear shaped charge lying against the motor case, as seen generally along the line 8—8 of FIG. 1.

DETAILED DESCRIPTION OF THE INVENTION

Missile 10 is broken away at the left or forward end thereof in FIG. 1. The forward end carries the guidance electronics and warhead of the missile. Most of the portion of the missile 10 shown in FIG. 1 is the rocket motor portion. The rocket motor has a case 12 which throughout most of its length is in the form of a cylindrical tube. The rocket motor case is normally closed, except for nozzle 14 at its rear end. Rocket motor case 12 normally carries a grain of solid rocket fuel therein. Upon combustion, this grain produces hot gas which raises the pressure within the rocket motor case. The hot gas is expelled from nozzle 14 producing thrust. Rocket motor case 12 is normally sufficiently strong to withstand the pressure of hot gas generation therein. The safety system of this invention is directed to opening the side of the rocket motor case 12 or weakening it sufficiently so that internal hot gas pressure causes opening of the side as the pressure rises.

Missile 10 is carried on a rail on the aircraft by means of hook 16. There is a similar hook farther forward on the missile. Opposite the hook, harness cover 18 is secured to the outside of the motor case 12 and extends forward along the outside of the missile from the motor case. Harness cover 18 carries various usual electrical connections across the rocket motor between the guidance and control sections.

The invention is illustrated in connection with a missile wherein the rocket motor case 12 is the outer wall of the aft part of the missile. This necessitates a harness cover which then also serves as a cover for the safety system of this invention. The harness cover also acts to provide an appropriate standoff distance for the thermal cord. In those missiles with a slip-in motor case, the system of this invention can be housed within the airframe with the thermal cord recessed into the skin.

When the safety system is used with other gas generators or pressure vessels, the thermal cord can be positioned with hardware that provides the proper standoff.

On its exterior surface, harness cover 18 has recesses 20 and 22 therein, see FIG. 2. Two lengths of thermal cord 24 and 26 lie in these recesses, substantially flush with the exterior of the harness cover 18. Thermal cords 24 and 26 are pyrotechnic devices which are specifically sensitive to temperature and are formulated to ignite (and provide a signal indicative thereof) when a preselected temperature and temperature duration have been reached. In the present case, thermal cords 24 and 26 self-ignite in a maximum time of 30 seconds when exposed to temperatures above 550° F. to 600° F. The signal must be provided by ignition of the thermal cords in a time less than the fast cookoff time of the rocket motor grain or other device being protected. The fast cook-off time is the time that the motor is exposed to a given temperature with a requirement for survival (i.e. no explosion or ignition of the motor fuel grain). Two cords are provided for redundancy. They are protected by a thin coat of black epoxy sealant. The inner ends of the cords 24 and 26 extend through an opening in harness cover 18, into an opening in the control module 28 to terminate in propellant 30 within bore 32 within control module 28. The outer end of bore 32 is closed by plug 34, see FIG. 4, which is held in place by pin 36. An O-ring around plug 34 aids in sealing, and in addition, packing is provided at the inner end of the plug and adhesive sealant is provided at the outer end of the plug. Propellant 30 generates hot gas when it is ignited by one of the thermal cords 24 or 26. With the right hand end of the bore 32 closed, as seen in FIG. 4, the gas expands to the left through the bore. Piston 38 is slidablly mounted in the bore and carries an O-ring therearound to protect propellant 30 before it is ignited and obturates the gas chamber. When the propellant is ignited, piston 38 is thrust to the left.

Piston 38 carries firing pin 40 thereon. Firing pin 40 extends toward transfer assembly 42 which contains percussion primer 44 and booster charge 46. Booster charge 46 has an explosive output. The transfer assembly 42 carrying primer 44 and booster charge 46 is a separate unit inserted into bore 48 in the body of control module 28. Bore 48 is in line with bore 32. Firing pin 40 is of such length that when fired, the firing pin 40 strikes primer 44 so that flame is generated to the left through bore 48. Shear pin 41 holds piston 38 in its unactuated position until propellant 30 generates sufficient gas so that pressure shears the pin 41. Thereupon, the gas under pressure thrusts firing pin 40 to the left.

Block ring 50 is of arcuate shape. It is in the form of a segment of a circular, tubular cylinder. Block ring 50 is positioned in its pocket 52, which is also of arcuate shape. Pocket 52 is sufficiently long to permit rotation of ring 50 within the pocket from the safe position illustrated in FIG. 3 to a firing position. In the safe position shown, block ring 50 completely closes off bore 48 so that the portion in which transfer assembly 42 is located is physically separated from the left end of the bore and prevents explosive transfer from the booster to the cutting charge. This is a physical barrier safety mechanism. This mechanism prevents ignition of primer 44 (without striking by the firing pin 40) from initiating flame propagation. Shear pin 58 prevents inadvertent rotation of the block ring. However, block ring 50 can be rotated so that window 54 in the block ring is in alignment with bore 48 to permit explosive propagation leftward through bore 48 when the unit is in firing condition.

Actuator 56 is positioned in the way of firing pin 40 when block ring 50 is in the blocking position. When the firing pin 40 moves to the left, it engages on actuator 56 which moves to the left. As the actuator moves to the left, it engages ring 50, shears pin 58 and moves the ring to its non-blocking position. As actuator 56 moves to the left, it drops off of shoulder 60 to move out of the way of firing pin 40. Thereupon, firing pin 40 can strike and fire the primer 44 to cause explosive propagation leftward down bore 48.

The left end of bore 48 has therein the end of an explosive charge such as linear shaped charge 62. As is seen in FIG. 8, the linear shaped charge 62 has a V-shaped linear explosive charge 64 and is captivated within charge holder 66 which, in turn, is surrounded by protective tubing 68. The charge holder is preferably of rubberlike material which maintains proper standoff. The protective tubing is of a suitable material for preventing moisture from collecting near the explosive. The protective tubing is preferably a heat-shrinking synthetic polymer composition material. Charge holder 66 carrying linear shaped charge 62 is secured by adhesive 69 within harness cover 18, as shown in FIG. 8. This maintains the charge at the proper standoff distance. When the explosive charge is ignited, it preferably cuts one or more stress raising notches in the outer portion of the case, or may cut directly through the case to the grain. The stress raising notches may be cut in selected locations along the length of the case. These notches or cuts are sufficient so that when the grain ignites, the rocket motor case splits and pressure is vented out of the split side rather than developing pressure which causes significant thrust by exhausting from the nozzle. In this way, the missile is prevented from uncontrolled flight due to fire while the missile is in storage, transport, or on the airplane prior to flight. Selectivity of notching or cutting along the length of the linear shaped charge can be controlled by insertion of an energy-absorbing structure such as lead wire within the V-groove along the charge in the lengths where no cutting is desired.

The use of a shaped charge for case cutting is preferred. However, linear non-shaped explosives such as Primacord or non-linear explosives can be used for case cutting.

When the case is subjected to fire, the exterior surface of the grain (next to the case) will burn so that pressure will build up between the grain and the case to split open the case at the stressraising notches. No nozzle thrust is produced because the interior of the grain is not ignited.

The use of a stress-raising notch rather than a cut protects the grain from an exterior fire that might ignite the grain early if the case were split open. In addition, the explosion should not cause substantial distribution of debris, which could endanger nearby fire fighters.

In some missiles, the aerodynamic heating of the missile 10 during normal flight is sufficiently high to cause ignition of the thermal cords 24 and 26. Of course, destruction of the missile in flight toward its target is undesired and, for this reason, in such missiles an inertial mechanism is provided in control module 28. Inertia mass 70 is positioned within pocket 72. Pocket 72 is sufficiently long to permit longitudinal sliding of the mass within the pocket. The side walls of the pocket guide the mass to limit it to longitudinal motion. Cover 74 encloses the mass within its pocket and also serves to cover block ring 50 within its pocket 52 and retain actuator 56 in its place. Compression spring 76 engages around firing pin 40 and between piston 38 and inertia mass 70. When the missile is accelerated upon launch, the acceleration forces inertia mass 70 to the right end of its pocket, compressing spring 76. With the inertia mass 70 in this position, piston 38 cannot move to the left because piston 38 is larger than the pocket in mass 70 in which lies spring 76. With mass 70 in the right position, the firing pin 40 cannot reach the primer in transfer assembly 42. Latch assembly 78 has shaft 80 which carries latch 82. When in the unactuated position shown in FIG. 3, latch 82 lies in longitudinal slot 84 in mass 70. Leaf spring 86 lies just outside of the slot 84 and is positioned and oriented to turn latch 82. It is seen that as the inertia mass 70 moves to the right with respect to the missile, from the position of FIG. 3 to the position of FIG. 5, the spring turns the latch. When the compression spring 76 attempts to return inertia mass 70 to the left, the latch engages against the end 88 of mass 70 because the latch is out-of-line with its slot. This retains inertia mass 70 in the rightmost position and prevents the firing pin 40 from moving to the left and precludes opening of the block ring and firing of the primer.

The missile may be dropped, or otherwise subjected to accelerations during shipping and handling, which would cause the inertia mass to move to the safe position shown in FIG. 5 where the thermally actuated safety system is ineffective. In order to provide visual inspection of the position of the latch, boss 90 which carries the shaft 80 therein, extends outward into an opening in harness cover 18 as shown in FIG. 6 and FIG. 7. The outer end of shaft 80 of the latch assembly has slot 92 therein which is in line with latch 82. Thus, the slot 92 is visible from the exterior of the missile so that the state of the safety system can be readily inspected and observed. In order to prevent contamination from entering into control module 28 through the opening between shaft 80 and boss 90, transparent sealing cover 94 is snapped into place, see FIG. 7. The outer end of the shaft is undercut and cover 94 snaps into that undercut and firmly engages in the shaft hole within the boss. Since the cover 94 is transparent, the orientation of slot 94 can be inspected. Should the latch assembly be in the system inactive position of FIG. 5, it can be returned to the active position by removal of cover 94 and engagement of a screwdriver in slot 92. The screwdriver will rotate the latch into alignment with longitudinal slot 84, whereupon the spring will return the inertia mass 70 to the left, active position.

As can be seen from this description of the structure, the entire thermally actuated rocket motor safety system is incorporated within the already existing harness cover 18. Therefore, there is no adverse influence upon the missile drag. Furthermore, the system is thermally activated, in direct response to high ambient temperature and sufficient time.

The system is arranged so that the temperature sensing portion is remote from the rocket motor case cutter. Since it is remote, the control module 28 can be placed therebetween. The control module maintains the system in the armed state and is placed in a safe condition by acceleration of the missile after the missile launch to prevent inadvertent firing of the rocket motor case cutter due to aerodynamic heating. The armed and safe positions are visible by inspection from the exterior of the missile. In this way, a thermally actuated rocket motor safety system provides safety against missile thrust due to fire near the missile while the missile is on the ground, during storage, transport or positioning on the aircraft ready for use.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A thermally actuated rocket motor safety system comprising:
   a thermal sensor for securing adjacent to a rocket motor and for sensing when temperature thereat reaches a temperature over a time indicating the presence of a fire;
   a control module, said control module being connected to receive a signal from said temperature sensor;
   means for cutting a rocket motor case for positioning adjacent to the rocket motor case, said means for cutting being connected to said control module to be actuated when said temperature sensor senses the selected temperature and time of heating; and
   acceleration sensing means within said control module for sensing acceleration resulting from normal operation of the rocket motor, said acceleration sensing means permitting said temperature sensor to actuate said cutting means only before sensing normal rocket motor acceleration and preventing said temperature sensor from actuating said rocket motor cutting means after normal acceleration.

2. The rocket motor safety system of claim 1 wherein said temperature sensor is a pyrotechnic device which ignites at the selected sensed time and temperature.

3. The rocket motor safety system of claim 2 wherein said rocket motor cutting means is a shaped charge for attachement to the rocket motor case.

4. The rocket motor safety system of claim 3 wherein said acceleration sensing means is an inertia mass which is moved from a first position to a second position upon normal rocket motor acceleration and wherein said second position inhibits said time and temperature sensor from actuating said rocket motor case cutter.

5. The rocket motor safety system of claim 1 wherein said rocket motor cutting means is an explosive charge for attachment adjacent the rocket motor case.

6. The rocket motor safety system of claim 5 wherein said acceleration sensing means is an inertia mass which is moved from a first position to a second position upon normal rocket motor acceleration and wherein said second position inhibits said time and temperature sensor from actuating said rocket motor case cutter.

7. The rocket motor safety system of claim 1 wherein said acceleration sensing means is an inertia mass which is moved from a first position to a second position upon normal rocket motor acceleration and wherein said second position inhibits said time and temperature sensor from actuating said rocket motor case cutter.

8. The rocket motor safety system of claim 7 wherein said rocket motor cutting means is shaped charge for attachement adjacent to the rocket motor case.

9. The rocket motor safety system of claim 8 wherein said temperature sensor is a pyrotechnic device which ignites at the selected sensed time and temperature.

10. A thermally actuated rocket motor safety system comprising:

a pyrotechnic temperature sensor for ignition when a predetermined time and temperature relationship is reached, the predetermined time and temperature corresponding to fire adjacent a rocket motor, said pyrotechnic temperature sensor being connected to a gas pressure generator;

a piston, said gas pressure generator driving said piston when actuated;

a firing pin on said piston;

an explosive charge for positioning adjacent a rocket motor case to cut the rocket motor case when said charge is initiated;

a primer positioned to be struck by said firing pin and connected to deliver explosive output to said explosive charge; and acceleration sensing means for inhibiting ignition of said explosive charge after acceleration corresponding to normal rocket motor firing is sensed.

11. The thermally actuated rocket motor safety system of claim 10 wherein said acceleration sensing means comprises an inertia mass, said inertia mass lying in a first position before rocket motor caused acceleration and lying in a second position after proper rocket motor caused acceleration, said inertia mass inhibiting firing pin motion when in said second position.

12. The thermally actuated rocket motor safety system of claim 11 wherein a latch is associated with said inertia mass, said latch being configured to be actuated by motion of said inertia mass from said first position to said second position so that when said latch is in its actuated position, it inhibits motion of said inertia mass from said second position to said first position.

13. The thermally actuated rocket motor safety system of claim 12 wherein an indication of the position of said latch is externally viewable so that said latch can be inspected to determine whether said inertia mass is in its second, safe position of in its first, armed position.

14. The thermally actuated rocket motor safety system of claim 13 wherein there is an opening through said inertia mass and said firing pin extends through said opening and said piston is larger than said opening through said inertia mass so that when said inertia mass is in its second position, said piston is inhibited from driving said firing pin a sufficient distance to reach said primer.

15. The thermally actuated rocket motor safety system of claim 10 wherein there is an opening through said acceleration sensing means and said firing pin extends through said opening and said piston is larger than said opening through said acceleration sensing means so that when said acceleration sensing means is in its second position, said piston is inhibited from driving said firing pin a sufficient distance to reach said primer.

16. A thermally actuated rocket motor safety system comprising:

a temperature sensor for sensing temperature adjacent a rocket motor and emitting a signal when the temperature exceeds a preselected value for a preselected minimum time duration;

means for cutting a stress-raising notch in a rocket motor case so that when said means is associated with a rocket motor case and when actuated, said notch vents pressure in the case out of the case; and control means for communicating said signal from said temperature sensor to said rocket motor case cutting means and for inhibiting said rocket motor case cutting means after acceleration due to normal rocket motor firing.

17. The thermally actuated rocket motor safety system of claim 16 wherein said control means includes an acceleration sensing means for sensing acceleration resulting from normal rocket motor firing, said acceleration sensing means being connected to both said temperature sensor and said rocket motor case cutting means for preventing actuation of said rocket motor case cutting means after said acceleration is sensed.

18. The thermally actuated rocket motor safety system of claim 17 wherein said acceleration sensing means is an inertia mass which is movable from a first position to a second position by acceleration due to normal rocket motor firing and a spring is provided to urge said inertia mass toward said first position and a latch is provided to retain said inertia mass in its second position after it reaches said second position.

19. The thermally actuated rocket motor safety system of claim 18 wherein the position of said latch can be externally determined, providing a visual indication whether said inertia mass is in its first, armed position or its second, safe position.

20. A thermally actuated safety system comprising:

a temperature sensor for sensing when temperature adjacent a pressure vessel exceeds a predetermined temperature for a duration indicative of fire adjacent the vessel and for providing a signal indicative thereof;

a vessel case cutter for positioning adjacent the case to cut the case when actuated; and a control module for communicating said signal to said case cutter, said control module having an inertia mass therein, said inertia mass being movable from a first position wherein said temperature sensor can actuate said case cutter to a second position wherein said temperature sensor is prevented from actuating said case cutter, said inertia mass being moved from said first position to said second position by acceleration.

21. The thermally actuated safety system of claim 20 wherein said temperature sensor is a thermally sensitive ignitor.

22. The thermally actuated safety system of claim 21 wherein said case cutter is a shaped charge for securing to the side of the vessel.

23. The thermally actuated safety system of claim 20 wherein said case cutter is a shaped charge for securing to the side of the vessel.

24. The thermally actuated rocket motor safety system of claim 1 wherein said case cutter is a charge for positioning adjacent the side of the case and a primer is positioned to ignite said charge, a firing pin positioned to ignite said primer, a piston on said firing pin, said temperature sensor being connected to a gas generator and said gas generator being positioned adjacent said piston so that generation of gas urges said firing pin toward said primer.

25. The thermally actuated rocket motor safety system of claim 24 wherein said inertia mass is positioned with respect to said firing pin to permit said firing pin to strike said primer when said inertia mass is in its first position and to prevent said firing pin from striking said primer when said inertia mass is in its second position.

* * * * *